US012490004B2

(12) United States Patent
Kaplan et al.

(10) Patent No.: US 12,490,004 B2
(45) Date of Patent: Dec. 2, 2025

(54) WATERPROOF AND ILLUMINATED SPEAKER SYSTEMS AND DEVICES

(71) Applicant: SSV WORKS, INC., Oxnard, CA (US)

(72) Inventors: Trevor Kaplan, Newbury Park, CA (US); Eleuterio Lopez, Oxnard, CA (US); Jesse Vandiver, Ojai, CA (US)

(73) Assignee: SSV Works, Inc., Camarillo, CA (US)

( * ) Notice: Subject to any disclaimer, the term of this patent is extended or adjusted under 35 U.S.C. 154(b) by 303 days.

(21) Appl. No.: 18/236,880

(22) Filed: Aug. 22, 2023

(65) Prior Publication Data

US 2025/0071455 A1 Feb. 27, 2025

(51) Int. Cl.

| | |
|---|---|
| ***H04R 1/02*** | (2006.01) |
| ***F21S 8/00*** | (2006.01) |
| ***F21Y 115/10*** | (2016.01) |
| ***H04R 1/44*** | (2006.01) |

(52) U.S. Cl.

CPC ................ *H04R 1/025* (2013.01); *F21S 8/03* (2013.01); *H04R 1/026* (2013.01); *H04R 1/44* (2013.01); *F21Y 2115/10* (2016.08); *H04R 2201/02* (2013.01); *H04R 2499/13* (2013.01)

(58) Field of Classification Search

CPC .......... H04R 1/025; H04R 1/026; H04R 1/44; H04R 2201/02; H04R 2499/13; H04R 1/028; H04R 1/023; H04R 1/24; F21S 8/03; F21Y 2115/10; F21V 33/0056

See application file for complete search history.

(56) References Cited

U.S. PATENT DOCUMENTS

| | | | | |
|---|---|---|---|---|
| 11,149,939 | B2 * | 10/2021 | Wilson ................ | F21V 33/0056 |
| 11,863,924 | B2 * | 1/2024 | Fadul ....................... | H04R 1/24 |

* cited by examiner

*Primary Examiner* — Angelica M Mckinney

(74) *Attorney, Agent, or Firm* — Ferguson Case Orr Paterson LLP

(57) ABSTRACT

One embodiment of an illuminated speaker system comprises a loudspeaker, an illuminated speaker cover that at least partially covers the loudspeaker, and an illuminated speaker pod to house the speaker and seal against the speaker cover. Embodiments of an illuminated speaker cover may comprise a grille, and a grille insert attached to the front end of the grille, a plurality of translucent components attached to the grille insert, and a light-emitting apparatus configured to connect to the back end of the grille and emit light towards the front end and through the plurality of translucent components. Embodiments of an illuminated speaker pod may comprise an outer shell, a translucent inner shell inserted into the outer shell, a light-emitting apparatus that emits light through openings of the outer shell from the inner shell, and a pod cover that seals the inner shell and light-emitting apparatus within the outer shell.

19 Claims, 14 Drawing Sheets

WATERPROOF AND ILLUMINATED SPEAKER SYSTEMS AND DEVICES

BACKGROUND OF THE DISCLOSURE

Field of the Disclosure

The disclosure relates generally to audio systems and devices, and specifically systems and devices directed to illuminating speakers for use in vehicles, for example, utility or all-terrain vehicles, and waterproofing the illuminated portions of the speakers.

Description of the Related Art

Speakers in utility and all-terrain vehicles are typically either illuminated and not weatherproof or weatherproof but not illuminated. It can be extremely expensive and difficult to weatherproof speakers that are illuminated from within. In other words, it can be costly and challenging for a manufacturer to seal and protect the electrical wiring and lighting required within a speaker in order to illuminate it.

Given the difficulty of weatherproofing, speakers in utility and all-terrain vehicles that are illuminated are only illuminated at the face of the pod rather than throughout the body of the pod. Moreover, the speaker grille is typically not illuminated or if it is, it is illuminated from the back of the pod and not from the grille or speaker cover.

SUMMARY OF THE DISCLOSURE

Described herein are illuminated speaker systems configured to emanate light from the inside out that also are configured to protect the illuminated portions from water and/or weather. In some embodiments, an illuminated speaker system according to the present disclosure comprises an illuminated speaker pod, a loudspeaker, and an illuminated speaker cover.

Also described herein are illuminated speaker pods. One embodiment of an illuminated speaker pod according to the present disclosure comprises (1) an outer shell with a plurality of openings; (2) a translucent inner shell that is configured to be inserted into the outer shell; (3) a light-emitting apparatus that integrates into the translucent inner shell; and (4) a pod cover that seals the translucent inner shell and light-emitting apparatus into the outer shell. In a preferred embodiment, the translucent inner shell has raised portions that integrate into and fill and seal the openings of the outer shell when the inner shell is inserted into the outer shell. A speaker pod may further comprise: (1) a ring of light emitting diodes; and a translucent ring to cover said ring of light emitting diodes. The translucent ring with the ring of light emitting diodes inside would be sealed between the outer shell, inner shell, and the light-emitting apparatus on one side and the pod cover on the other side.

Furthermore, described herein are illuminated speaker covers. One embodiment of an illuminated speaker cover according to the present disclosure comprises: (1) a grille; (2) a grille insert that attaches to the front side of the grille; (3) a light-emitting apparatus configured to connect to the back side of the grille and emit light towards the front end of the grille; and (4) a plurality of translucent components that attach to the grille insert and allow light through from the light-emitting apparatus.

This has broadly outlined the features and technical advantages of the present disclosure in order that the detailed description that follows may be better understood.

Additional features and advantages of the disclosure will be described below. It should be appreciated by those skilled in the art that this disclosure may be readily utilized as a basis for modifying or designing other systems or methods for carrying out the same purposes of the present disclosure.

These and other further features and advantages of the disclosure would be apparent to those skilled in the art from the following detailed description, taken together with the accompanying drawings, wherein like numerals designate corresponding components or steps in the figures, in which:

DETAILED DESCRIPTION OF THE DISCLOSURE

Figure 1:
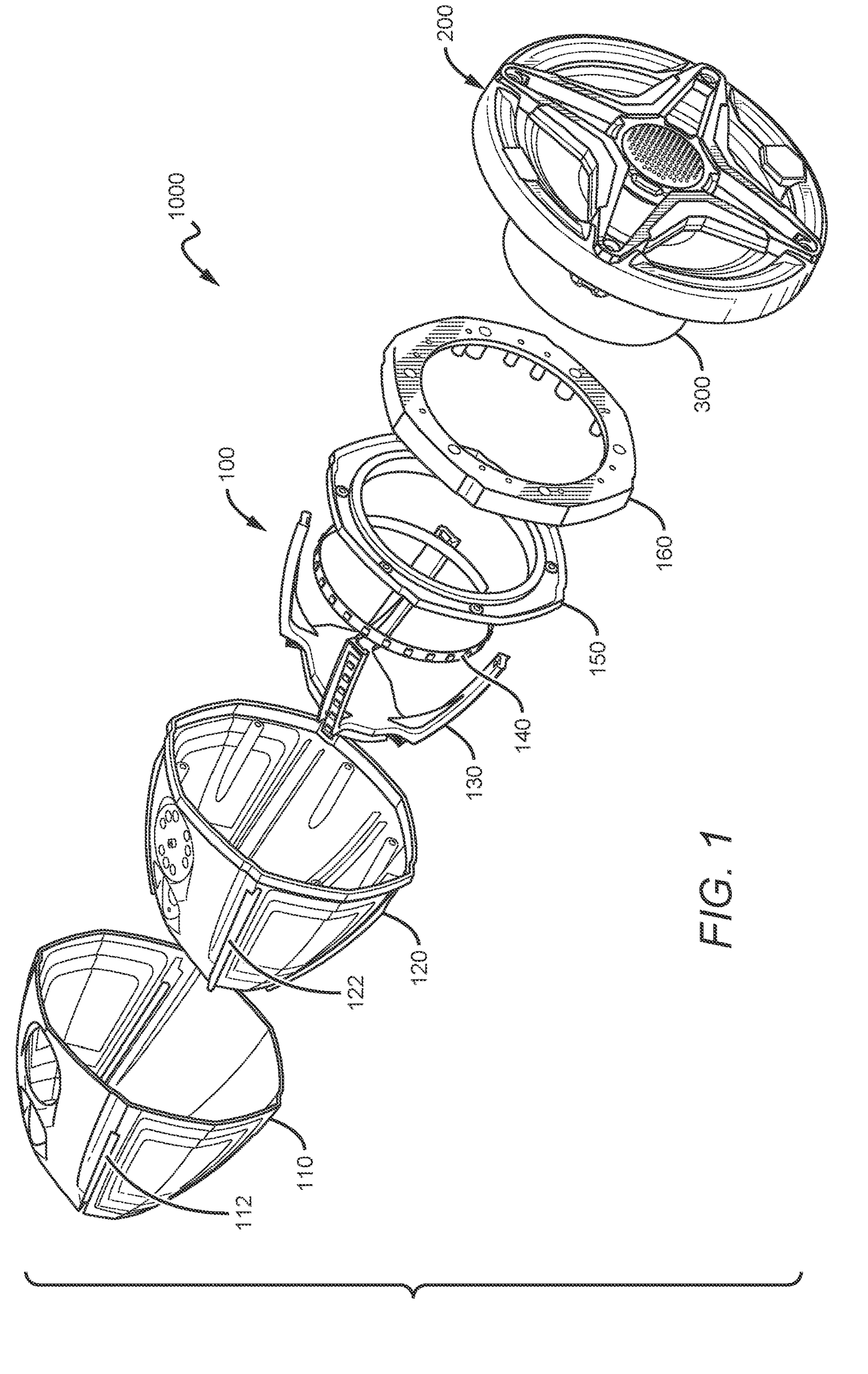
FIG. 1 is a front, top, and left-side view of an illuminated speaker system according to an embodiment of the present disclosure with an exploded view of the speaker pod.

Embodiments of the present disclosure provide illuminated speakers for vehicles wherein the illuminated portions of the speaker pods and speaker covers are waterproof and protected from the outside elements. One embodiment of an illuminated speaker system comprises a loudspeaker, an illuminated speaker cover that at least partially covers the loudspeaker, and an illuminated speaker pod to house the speaker and the speaker cover. Embodiments of an illuminated speaker cover may comprise a grille, a grille insert attached to the front side of the grille, a plurality of translucent components attached to the grille insert, and a light-emitting apparatus configured to connect to the back side of the grille and emit light towards the front and through a plurality of translucent components. Embodiments of an illuminated speaker pod may comprise an outer shell with a plurality of openings, a translucent inner shell inserted into the outer shell with raised portions that are configured to fill and seal the openings of the outer shell, a light-emitting apparatus that emits light through the openings of the outer shell from the inner shell, and a pod cover that seals the inner shell and light-emitting apparatus within the outer shell.

Throughout this description, the embodiments and examples illustrated should be considered as exemplars, rather than as limitations on the present disclosure. As used herein, the term "disclosure," "device," "present disclosure," or "present device" refers to any one of the embodiments of the disclosure described herein, and any equivalents. Furthermore, reference to various feature(s) of the "disclosure," "device," "present disclosure," or "present device" throughout this document does not mean that all claimed embodiments or methods must include the referenced feature(s).

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to different views and illustrations that are schematic illustrations of idealized embodiments of the disclosure. As such, variations from the shapes of the illustrations as a result, for example, of manufacturing techniques and/or tolerances are expected. Embodiments of the disclosure should not be construed as limited to the particular shapes of the regions illustrated herein, but are to include deviations in shapes that result, for example, from manufacturing.

Figure 2:
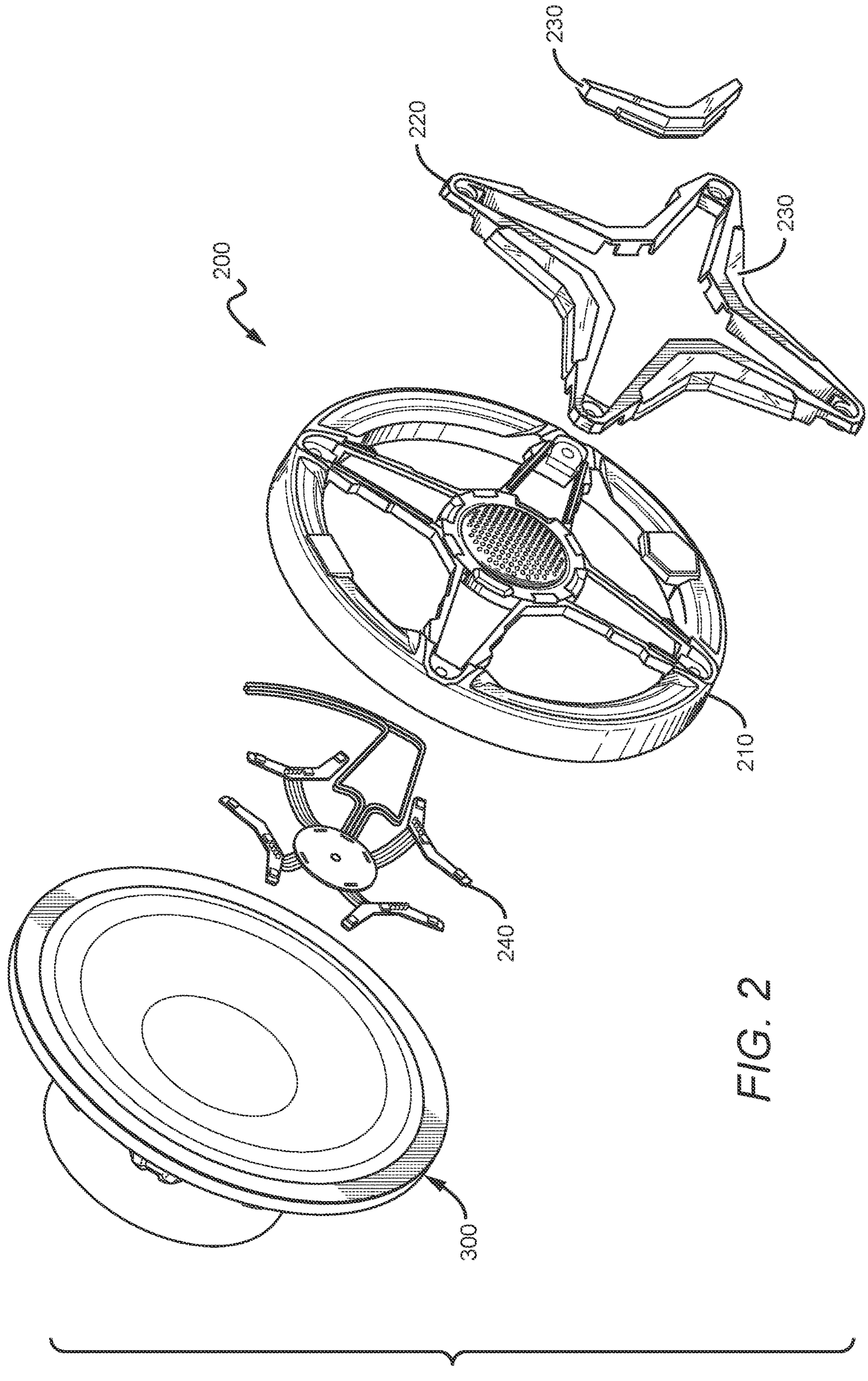
FIG. 2 is a front, top, and left-side exploded view of an illuminated speaker cover according to an embodiment of the present disclosure.
Figure 3:
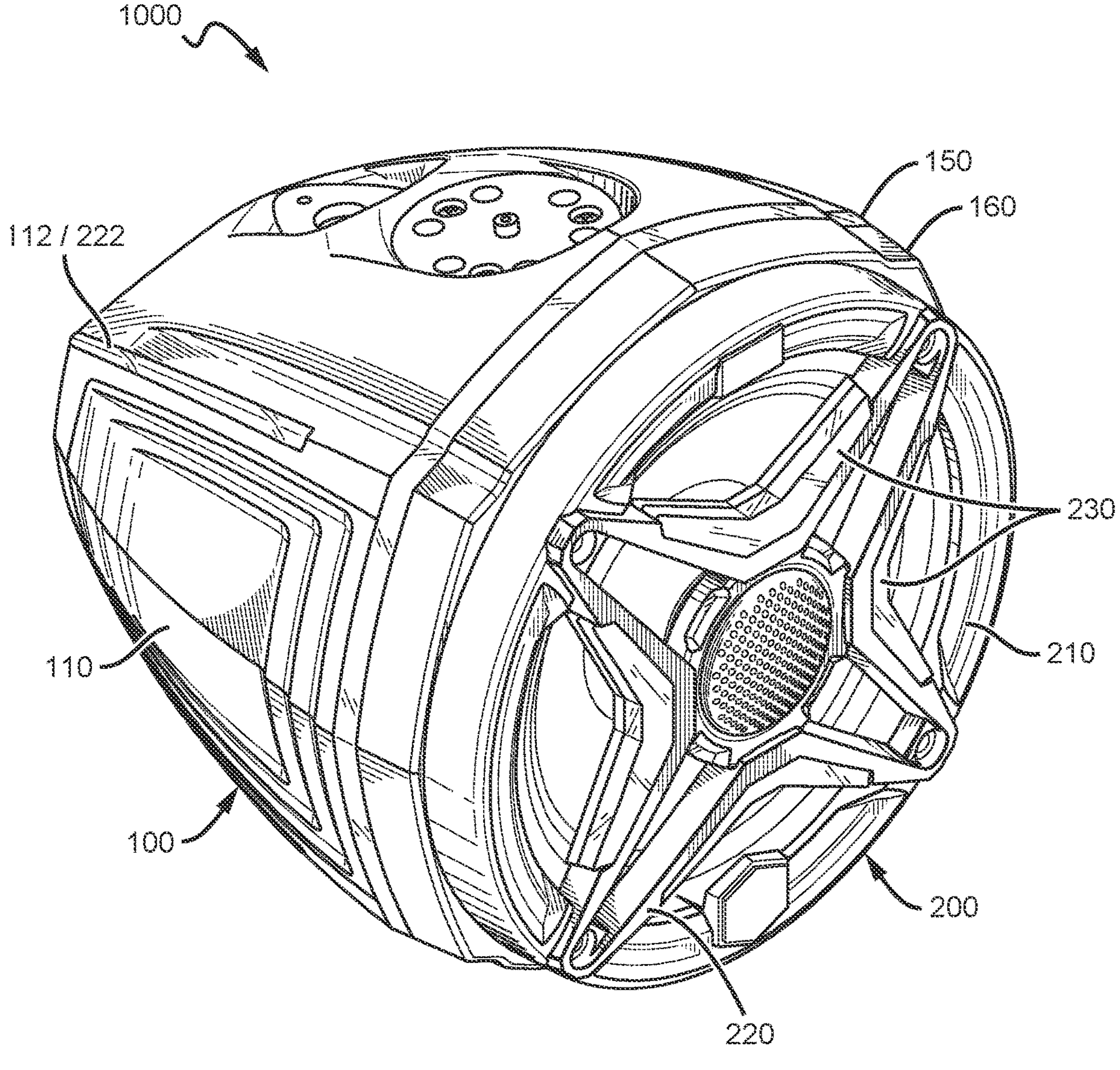
FIG. 3 is a front, top, left-side perspective view of an illuminated speaker system according to an embodiment of the present disclosure.
Figure 4:
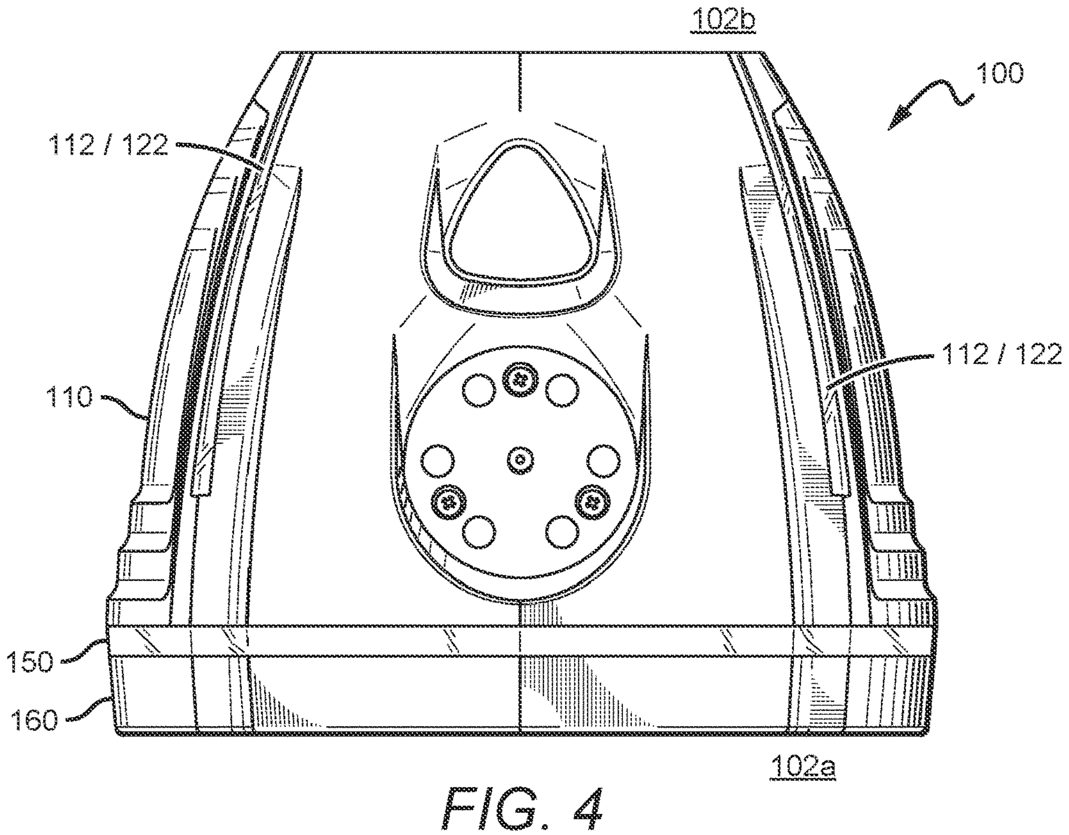
FIG. 4 is a top view of the illuminated speaker pod according to an embodiment of the present disclosure.
Figure 5:
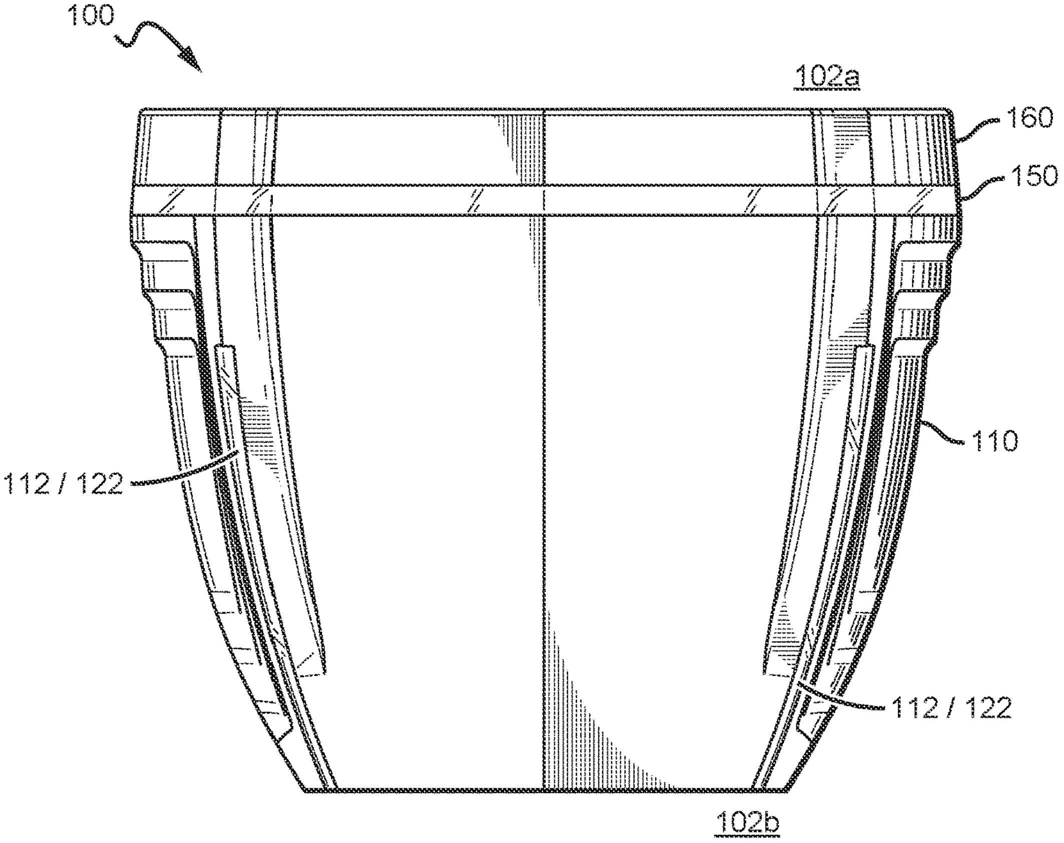
FIG. 5 is a bottom view of the illuminated speaker pod according to the embodiment of the present disclosure shown in FIG. 4.
Figure 6:
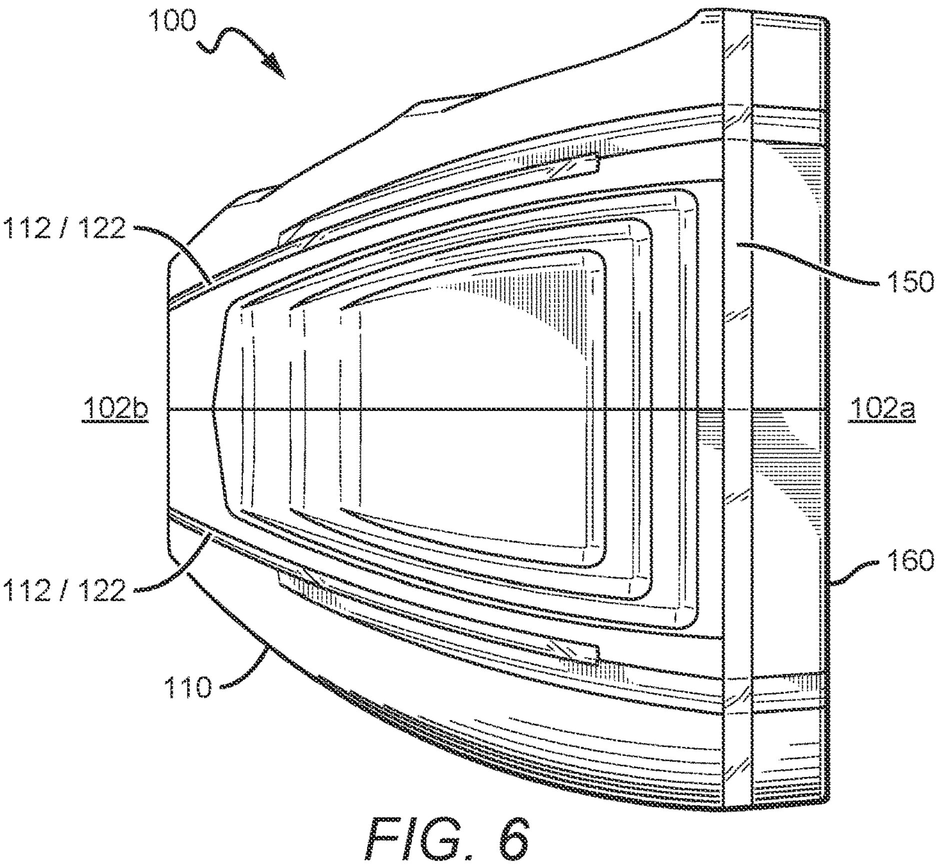
FIG. 6 is a left side view of the illuminated speaker pod according to the embodiment of the present disclosure shown in FIG. 4.
Figure 7:
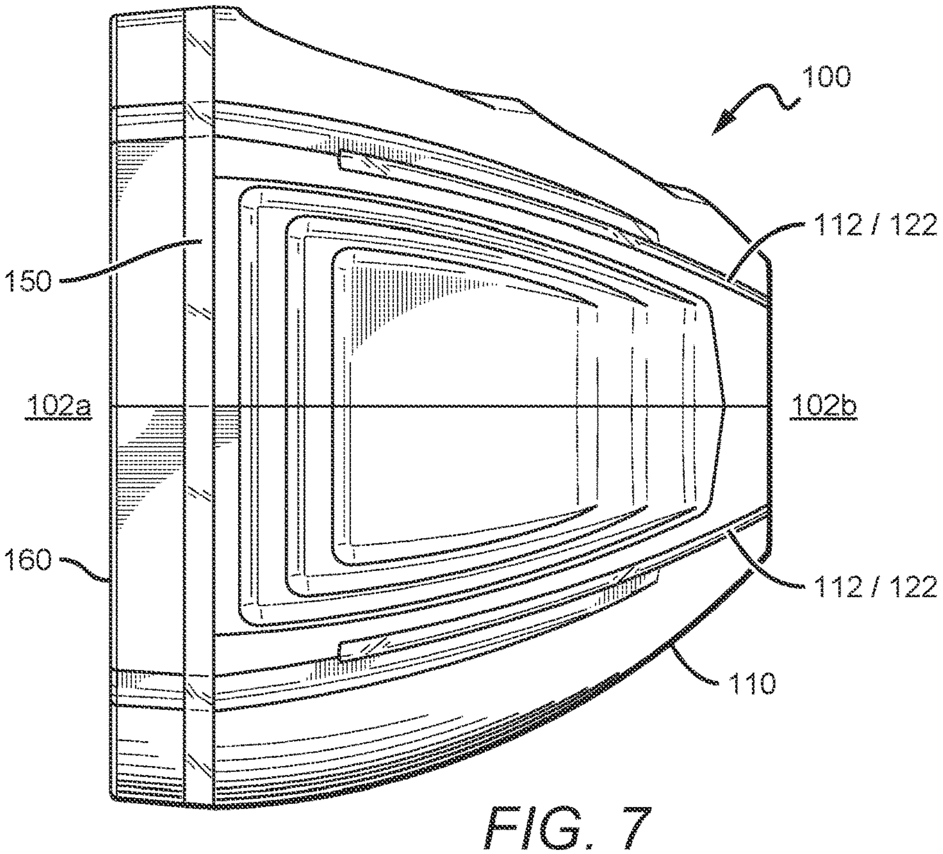
FIG. 7 is a right side view of the illuminated speaker pod according to the embodiment of the present disclosure shown in FIG. 4.
Figure 9:
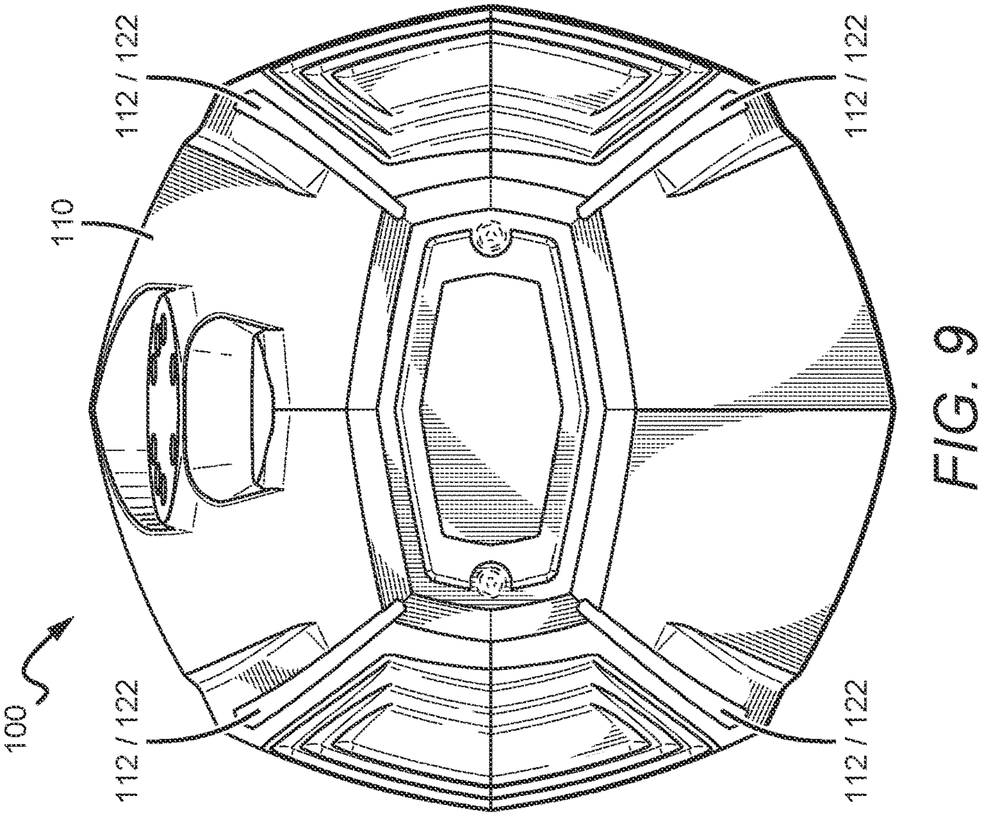
FIG. 9 is a back view of the illuminated speaker pod according to the embodiment of the present disclosure shown in FIG. 4.
Figure 8:
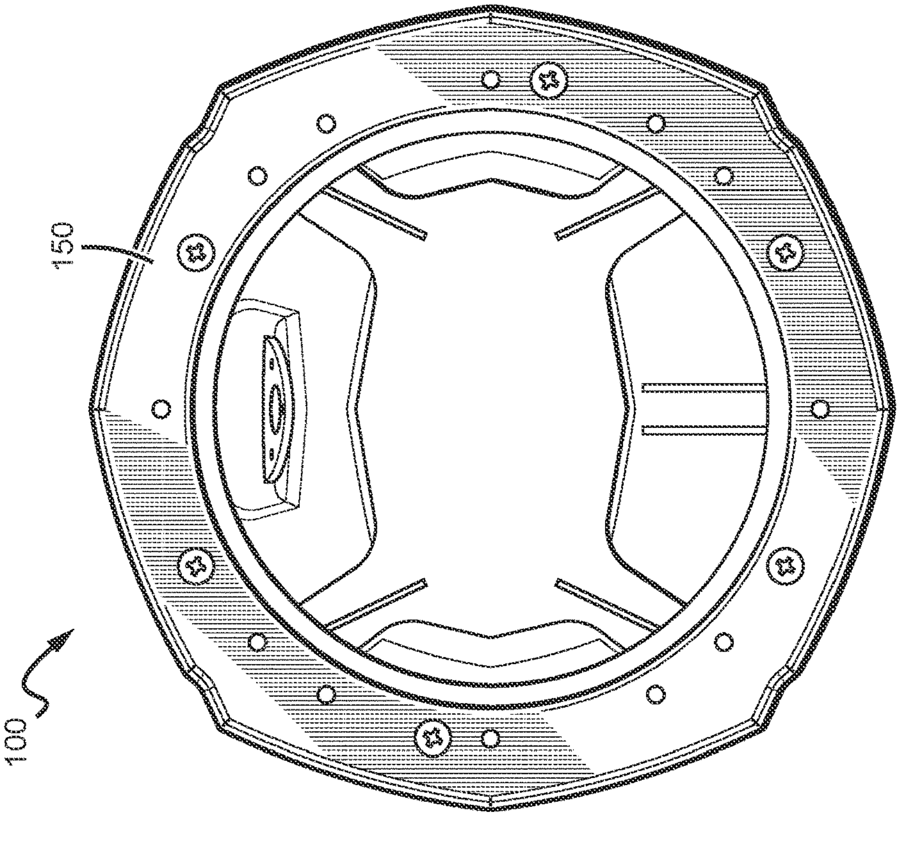
FIG. 8 is a front view of the illuminated speaker pod according to the embodiment of the present disclosure shown in FIG. 4.

FIGS. 1 and 2, together, are an exploded view of an illuminated speaker system 1000 according to an embodiment of the present disclosure. The illuminated speaker system 1000, as also shown in FIG. 3, comprises an illuminated speaker cover 100, an illuminated speaker cover 200, and a loudspeaker 300. The illuminated speaker cover 200 is configured to attach and at least partially cover a loudspeaker 300. And, the illuminated speaker pod 100 is configured to house the loud speaker 300 that is connected to the illuminated speaker cover 200.

As shown in FIG. 1, one embodiment of the illuminated speaker pod 100 comprises an outer shell 110, an inner shell 120, a light-emitting apparatus 130, and a pod cover 160. The inner shell 120 is configured to be inserted into the outer shell 110, and the light-emitting apparatus 130 is configured to be inserted into the inner shell 120. Ultimately, the inner shell 120 and the light-emitting apparatus 130 are integrated into the outer shell 110 and the pod cover 160 seals against the outer shell 110. The pod cover 160 may be opaque or translucent.

FIGS. 4-8 are various views of an illuminated speaker pod 100 according to an embodiment of the present disclosure. The speaker pod 100 has a front side 102*a* and a back side 102*a*. Embodiments of an illuminated speaker pod 100 may further comprise a plurality of light-emitting diodes 140 and a translucent ring 150 to cover or surround the plurality of light-emitting diodes, wherein the translucent ring 150 containing the plurality of light-emitting diodes 140 is sealed to the outer shell 110, inner shell 120, and the light-emitting apparatus on one side 130, and the pod cover 160 on the other side. This embodiment is best shown in FIGS. 3-7 and FIG. 25.

As shown in FIG. 2, one embodiment of an illuminated speaker cover 200 comprises a grille 210, a grille insert 220, a plurality of translucent components 230, and a light-emitting apparatus 240.

Figure 10:
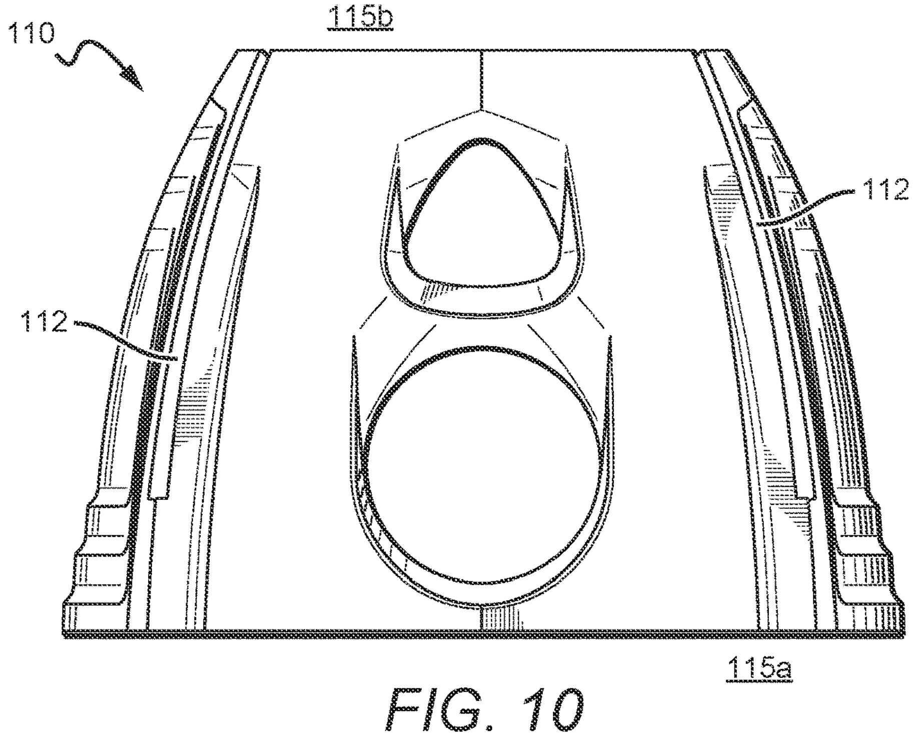
FIG. 10 is a top view of an outer shell of the illuminated speaker pod according to the embodiment of the present disclosure shown in FIG. 4.
Figure 11:
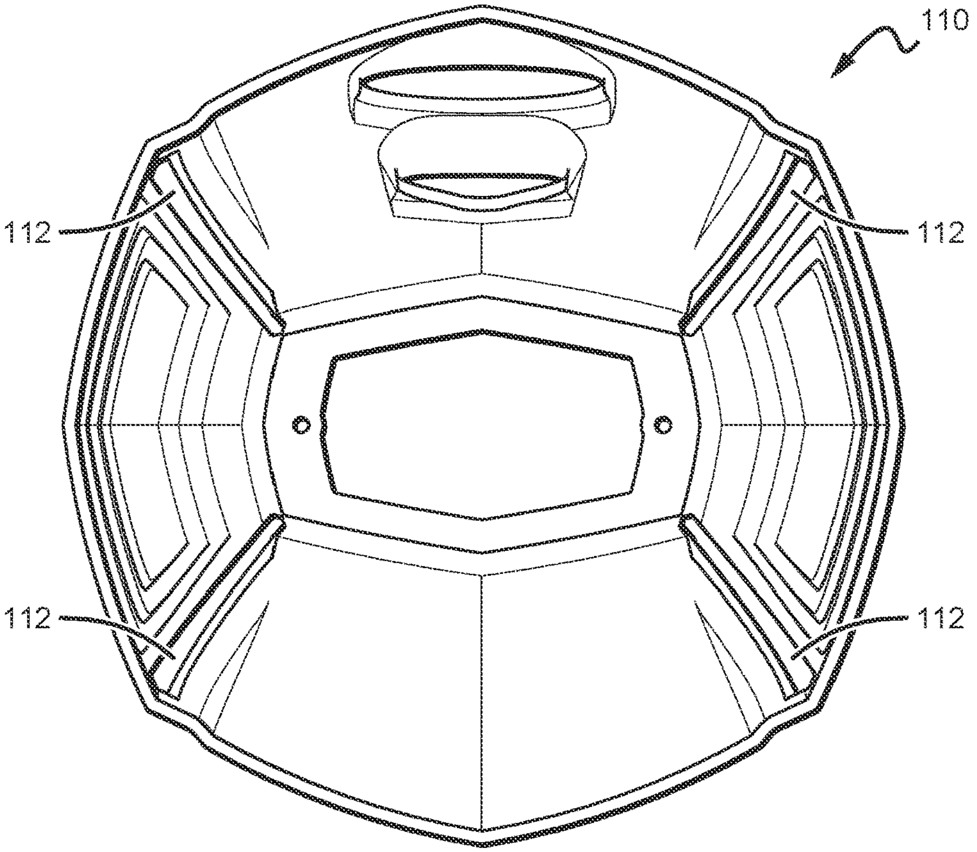
FIG. 11 is a front view of an outer shell of the illuminated speaker pod according to the embodiment of the present disclosure shown in FIG. 4.
Figure 12:
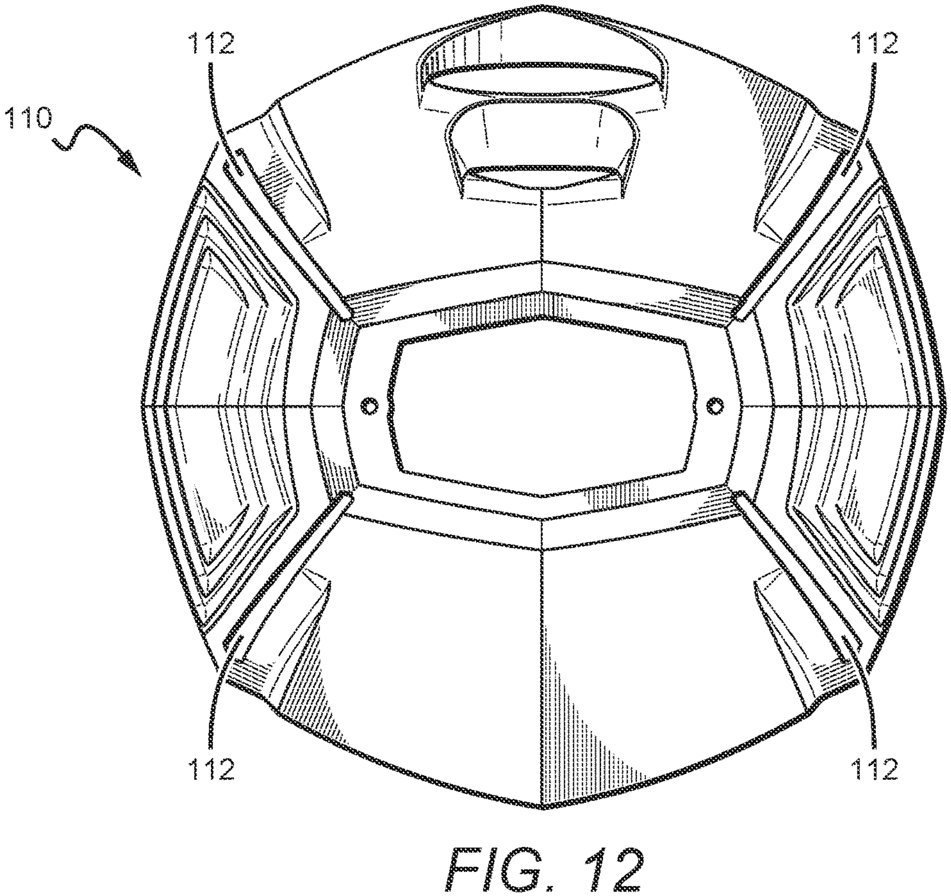
FIG. 12 is a back view of an outer shell of the illuminated speaker pod according to the embodiment of the present disclosure shown in FIG. 4.

FIGS. 10-12 depict various views of an outer shell 110 of an illuminated speaker pod 100 according to an embodiment of the present disclosure. The outer shell 110 shown has an open front side 115*a*, a closed back side 115*b*, and the body of the outer shell 110 is between the open end 115*a* and closed end 115*b*. The body of the outer shell 110 shown in FIGS. 10-12 is conical with the narrower end at the closed end 115*b* and growing gradually wider to the open end 115*a*. In a preferred embodiment, the outer shell 110 is opaque, but it is understood that portions or the outer shell 110 may be translucent or clear such as the back side.

The openings 112 in the body of the outer shell 110 are most clearly depicted in FIGS. 10-12. In the embodiment shown, the openings 112 are rectangular in shape (i.e., slotted) and run along the body of the outer shell 110 from the closed end 115*b* towards the open end 115*a* but stop before the open end 115*a*. But, it is understood that the openings may be different shapes and have different configurations. Moreover, the embodiment shown has four openings 112 but it is understood that the outer shell 110 may have more or less openings 112.

Figure 13:
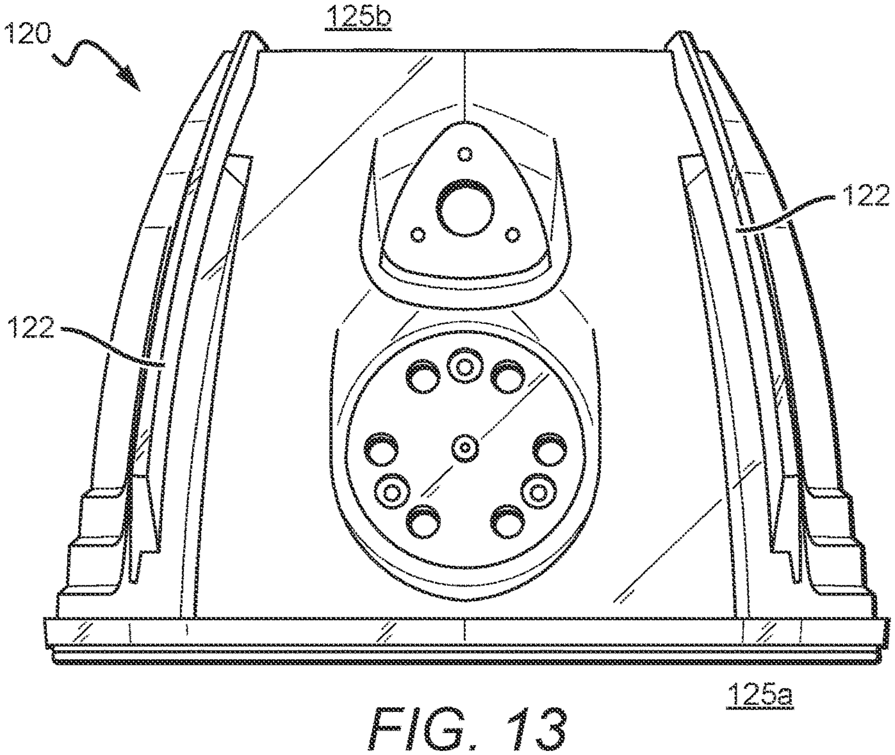
FIG. 13 is a top view of a translucent inner shell of the illuminated speaker pod according to the embodiment of the present disclosure shown in FIG. 4.
Figure 14:
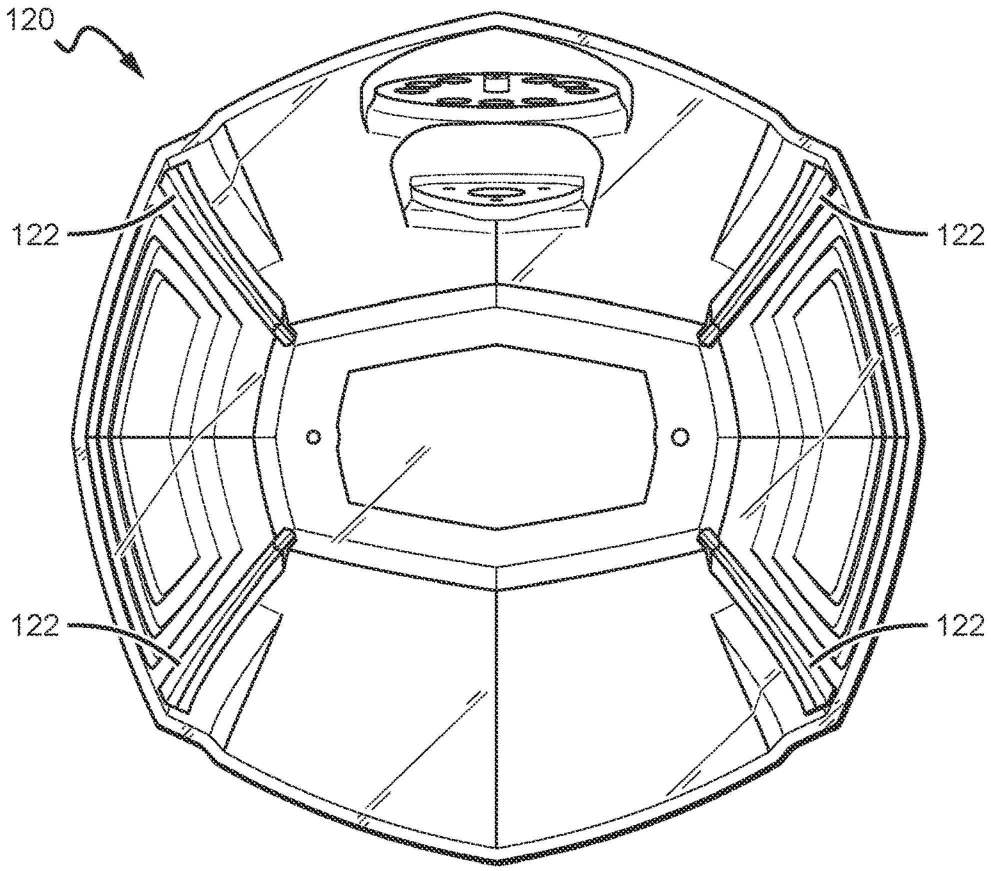
FIG. 14 is a back view of a translucent inner shell of the illuminated speaker pod according to the embodiment of the present disclosure shown in FIG. 4.

FIGS. 13 and 14 show various views of a translucent inner shell 120 of an illuminated speaker pod 100 according to an embodiment of the present disclosure. The translucent: inner shell 120 is configured to be inserted into the outer shell 110. Like the outer shell 110, the translucent inner shell 120 has an open front 125*a* and a closed back 125*b*. Also like the outer shell 110, the translucent inner shell 120, shown in FIGS. 13 and 14, is conical in shape, gradually widening from the back 125*b* to the front 125*a*. In a preferred embodiment, when inserted into the outer shell 110, raised portions 122 of the translucent inner shell 120 are configured to fill and seal the openings 112 of the outer shell 110.

The sealing of the pod cover 160 against the outer shell 110 in addition to sealing the openings 112 of the outer shell 110 with the raised portions 122 of the inner shell 120 protect the light-emitting apparatus from the ambient elements, including water and rain.

Figure 15:
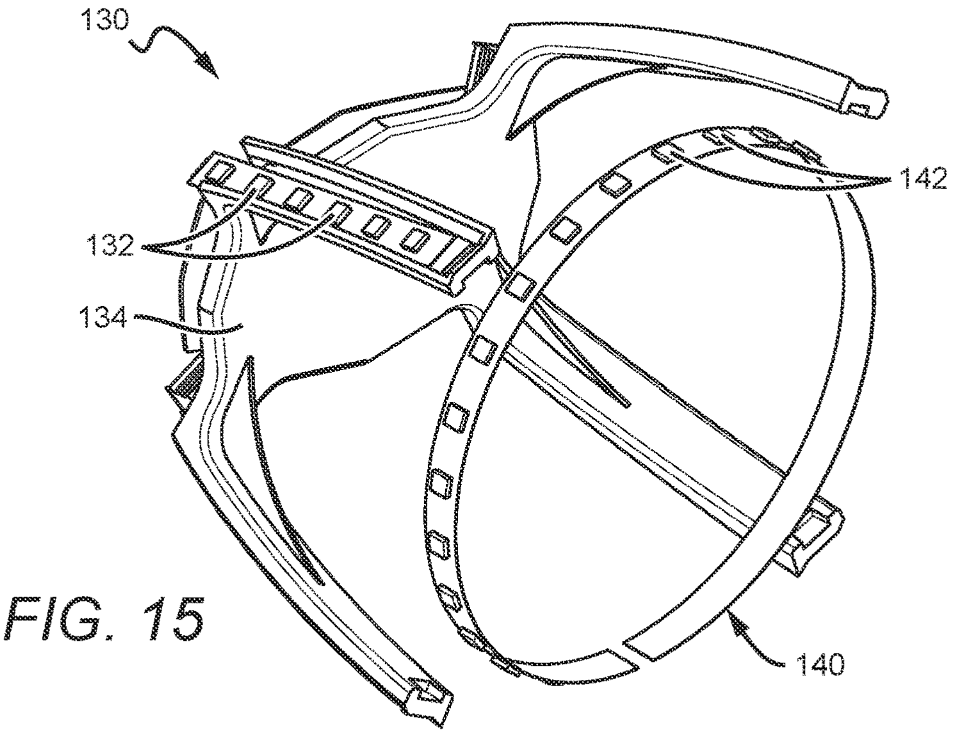
FIG. 15 is a front, top, left-side perspective view of (1) a light-emitting apparatus and (2) a ring of light emitting diodes of the illuminated speaker pod according to the embodiment of the present disclosure shown in FIG. 4.
Figure 17:
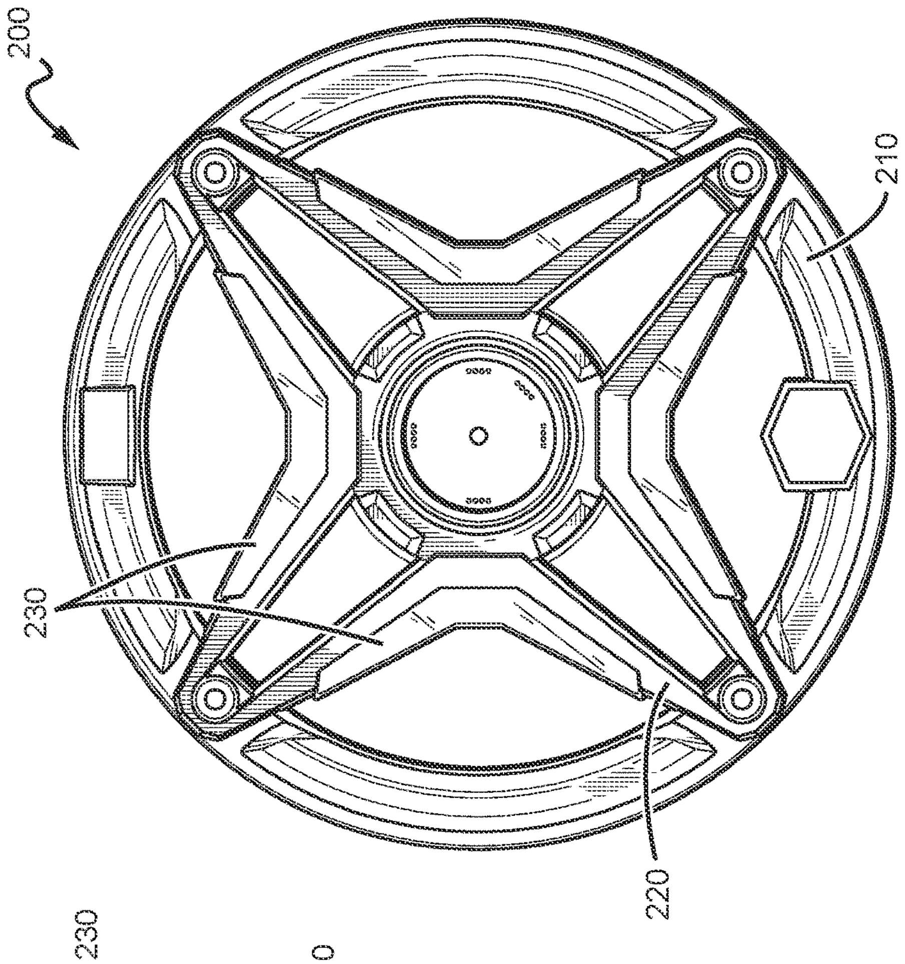
FIG. 17 is a front view of the illuminated speaker cover according to the embodiment of the present disclosure shown in in FIG. 16.
Figure 16:
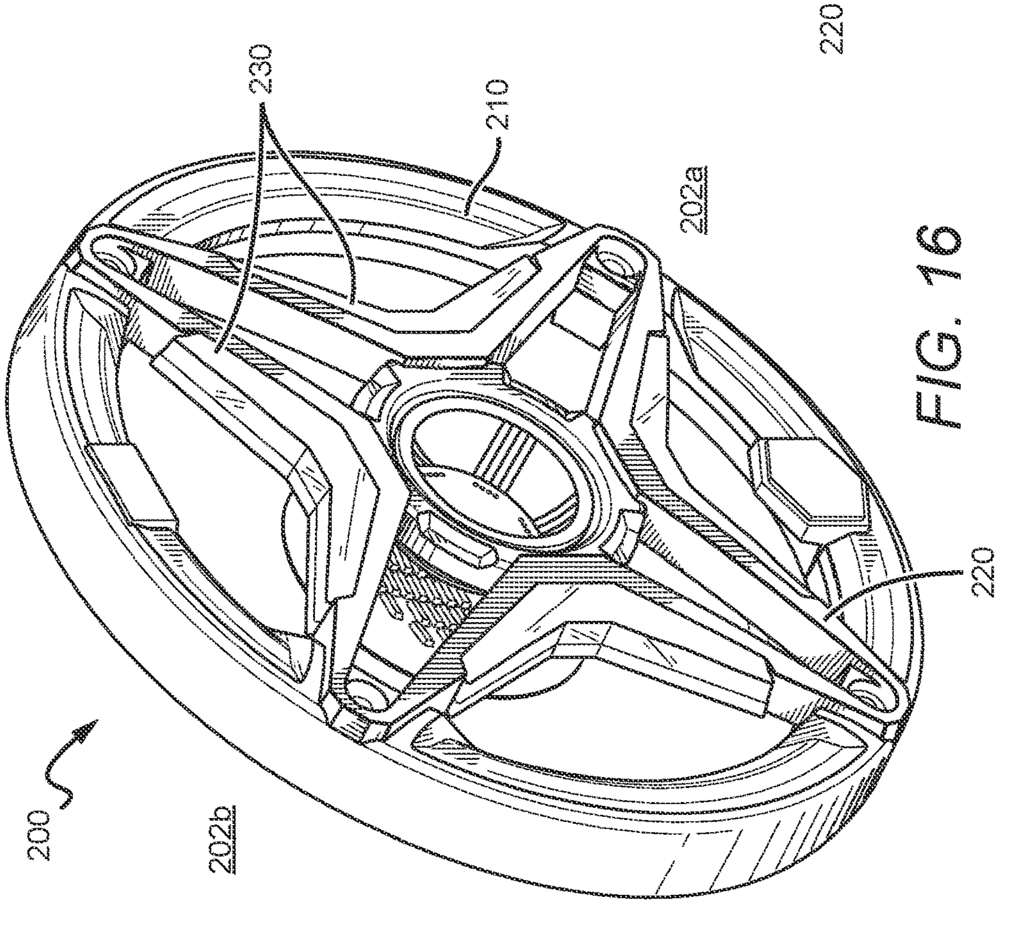
FIG. 16 is a front, top, left-side perspective view of an illuminated speaker cover according to an embodiment of the present disclosure.
Figure 19:
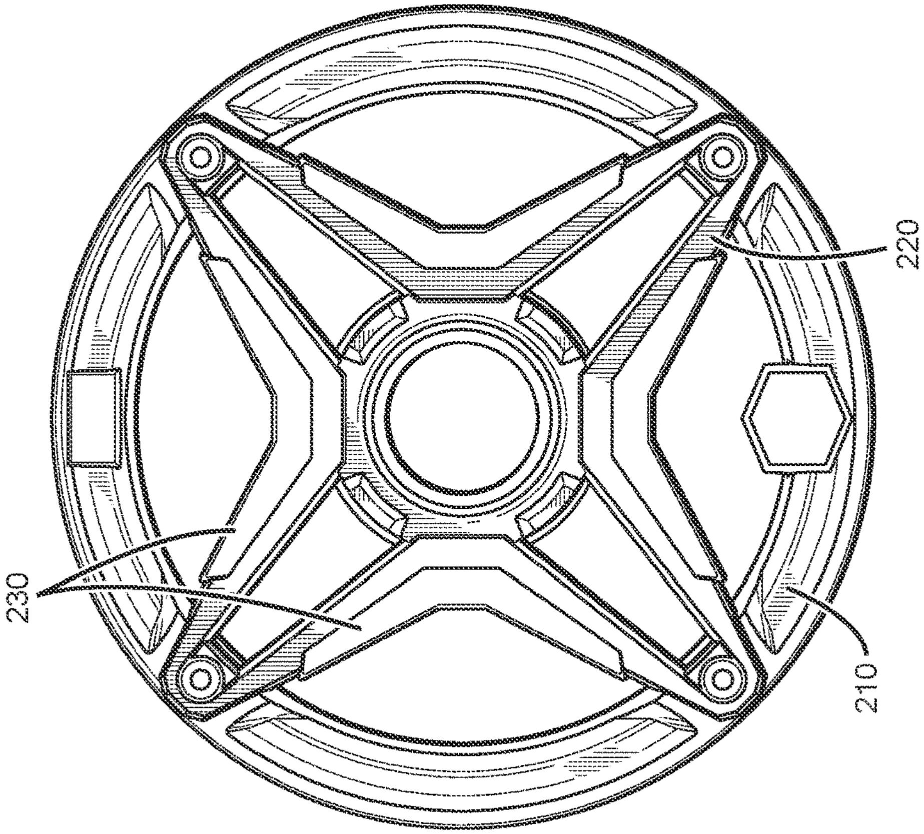
FIG. 19 is a front view of the grille, grille insert, and translucent components of the illuminated speaker cover according to the embodiment of the present disclosure shown in FIG. 16.

An embodiment of a light-emitting apparatus 130 of an illuminated speaker pod 100 according to an embodiment of the present disclosure is shown in FIGS. 1 and 15. The light-emitting apparatus 130 is configured to be inserted into and held by the inner shell 120.

Figure 25:
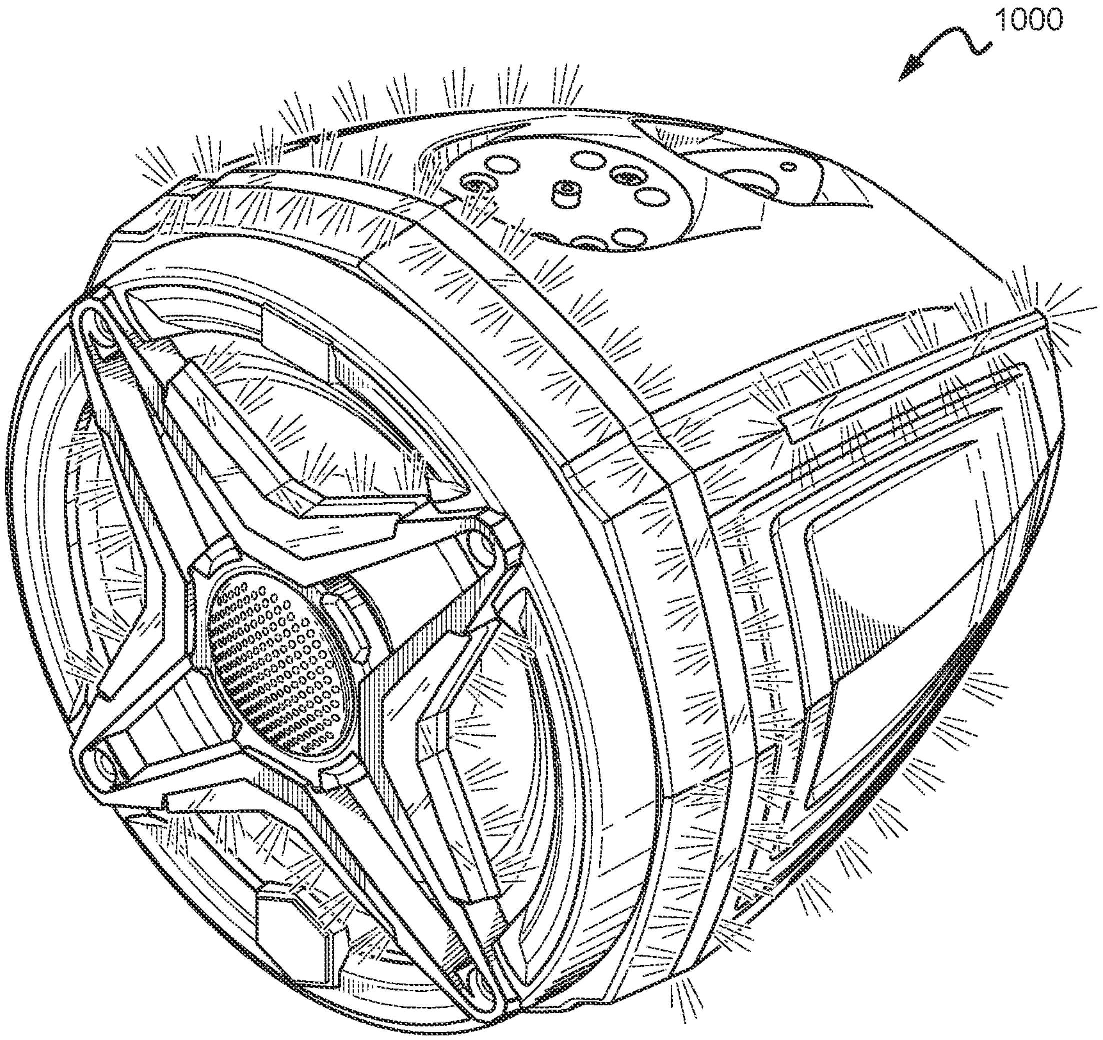
FIG. 25 is a front, top, left-side perspective view of an illuminated speaker system shown in FIG. 3 with the light sources in an illuminated state.

The light-emitting apparatus 130 comprises an array of light emitting diodes 132. In some embodiments, the light-emitting apparatus 130 is shaped so as to place the light emitting diodes 132 underneath the raised portions 122 of the inner shell 120 when the apparatus 130 is inserted. For example, FIGS. 1 and 15 show an example of a light-emitting apparatus 130 with four arms that each have a plurality of light emitting diodes 132. The light-emitting apparatus 130 causes light to emit from within the inner shell 120, and specifically the raised portions 122, through the openings 112 of the outer shell 110. The illumination through the openings 112 of the outer shell 110 and the raised portions 122 of the inner shell 120 is best shown in FIG. 25. If portions of the outer shell 110 are translucent, the light-emitting apparatus 130 may be configured to position light-emitting diodes 132 underneath the translucent portions of the outer shell 110 to emit light through them.

Some embodiments of the illuminated speaker pod 100 further comprise (1) a ring 140 of light-emitting diodes 142; and (2) a translucent ring 150 configured to enclose and cover the ring 140 of light-emitting diodes 142. As shown in FIGS. 3-7 and 25, the translucent ring 150 with the enclosed ring 140 of light-emitting diodes 142 is sealed in between the outer shell 110, inner shell 120, and light-emitting apparatus 130 on one side and the pod cover 160 on the other side.

FIGS. 2 and 16-18 show various views of one embodiment of an illuminated speaker cover 200 according to the present disclosure. The illuminated speaker cover 200 comprises a grille 210, a grille insert 220, a plurality of translucent components 230, and a light-emitting apparatus 240. One embodiment of a grille 210 according to the present disclosure comprises an outer frame, a center frame, and at least one arm between the outer frame and the center frame. The grille 210 also has a front 202*a* and a back 202*b*.

Figure 24:
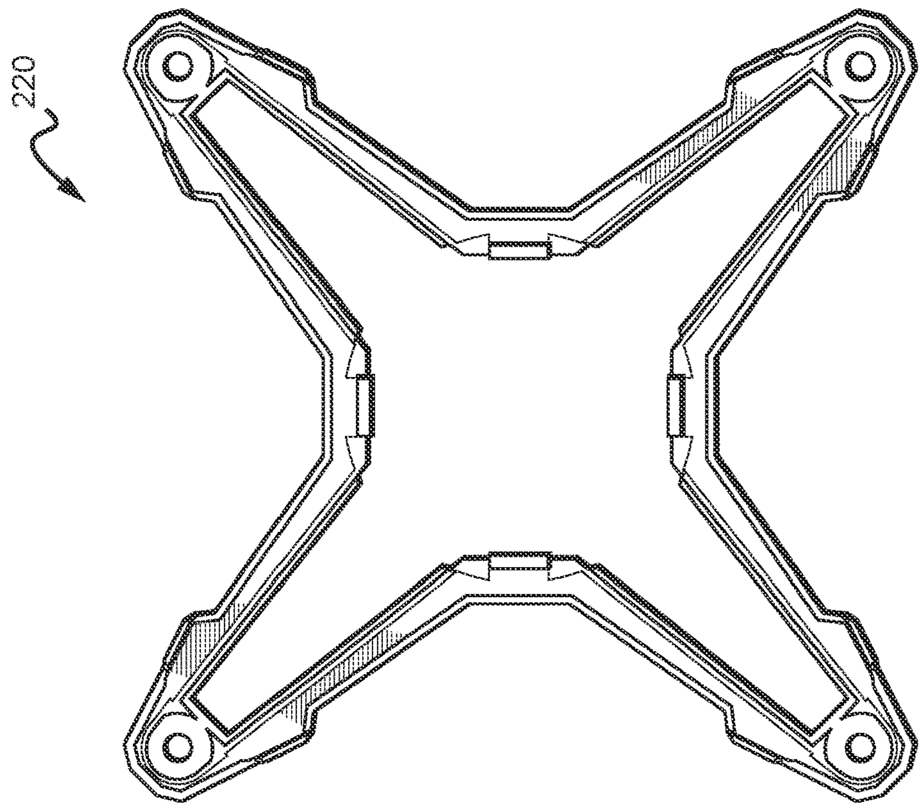
FIG. 24 is a back view of the grille insert of the illuminated speaker cover according to the embodiment of the present disclosure shown in FIG. 16.
Figure 23:
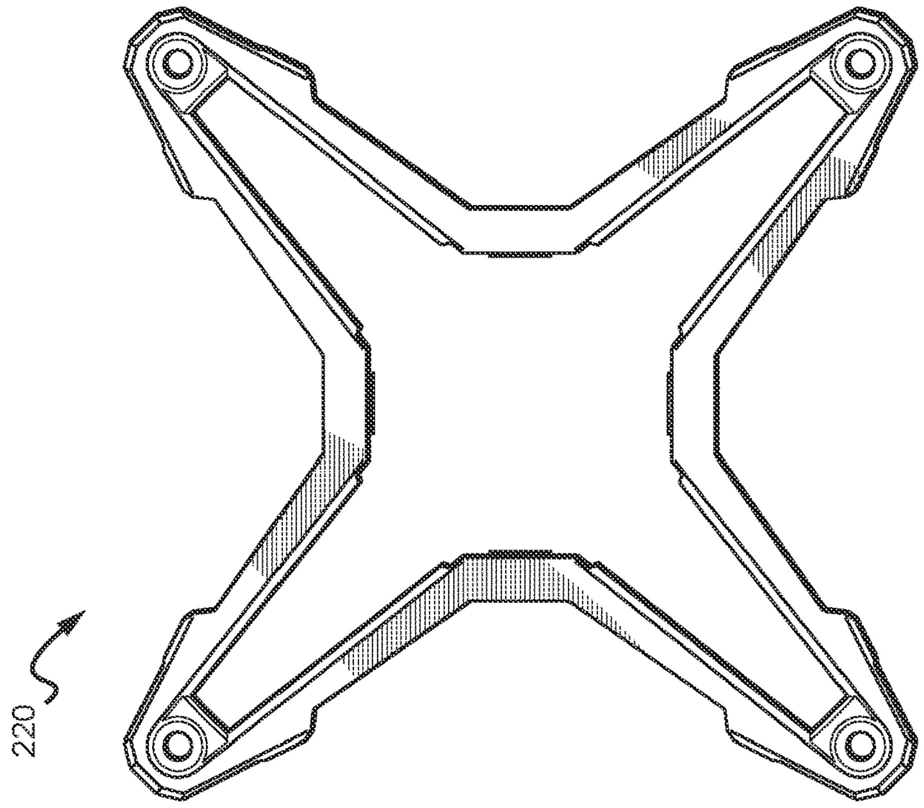
FIG. 23 is a front view of the grille insert of the illuminated speaker cover according to the embodiment of the present disclosure shown in FIG. 16.

FIGS. 23 and 24 show various views of one embodiment of a grille insert 220 according to the present disclosure. The grille insert 220 attaches to the front 202*a* of the grille 210 as can be seen in FIGS. 16-19. The grille insert 220 shown has four arms and is has a general star-like shape, but it is understood that different shapes and numbers of arms are possible to correspond with the number of arms of the grille 210.

The translucent components 230 attach to the grille insert 220. In the embodiment shown in FIGS. 16-20, the translucent components 230 are attached to the grille insert 220 at its center and in between the arms. It is understood that other configurations are possible and that this is one of many different embodiments claimed. For example, the translucent components 230 could attach to the grille 210 at the outer frame or could attach to the grille insert 220 arms and not to the center. There are four translucent components in FIGS. 16-20 but it is understood that more or less are possible such as 2, 3, 5, and so on.

Figure 18:
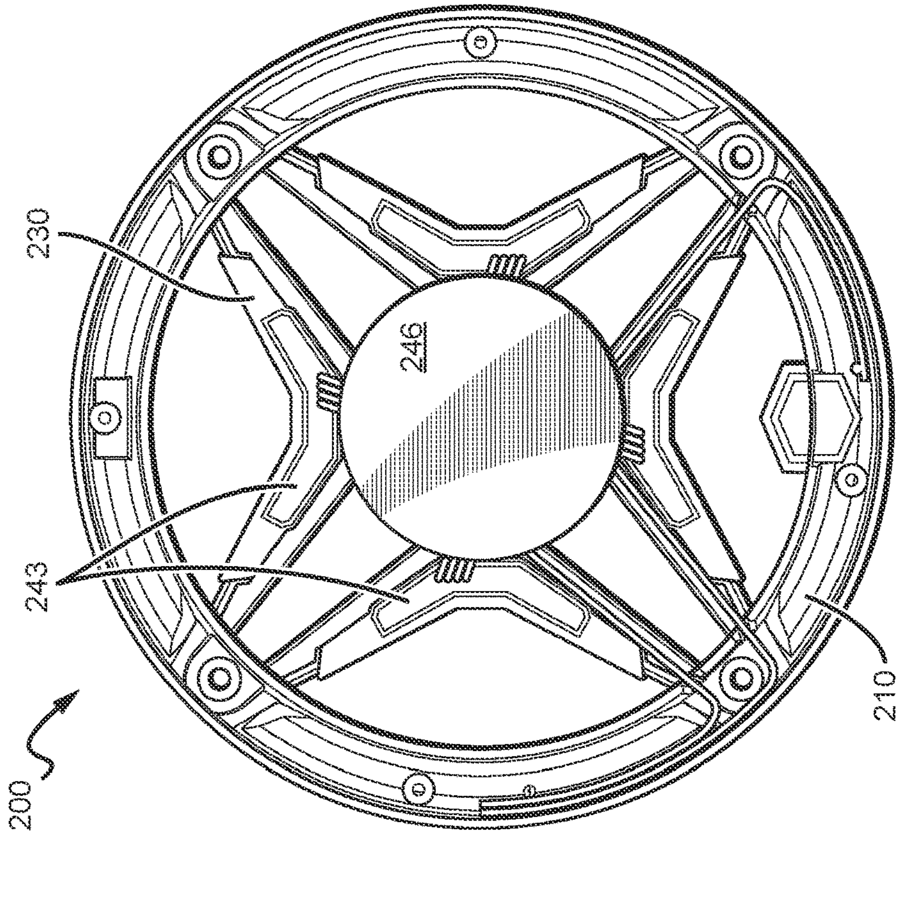
FIG. 18 is a back view of the illuminated speaker cover according to the embodiment of the present disclosure shown in FIG. 16.
Figure 21:
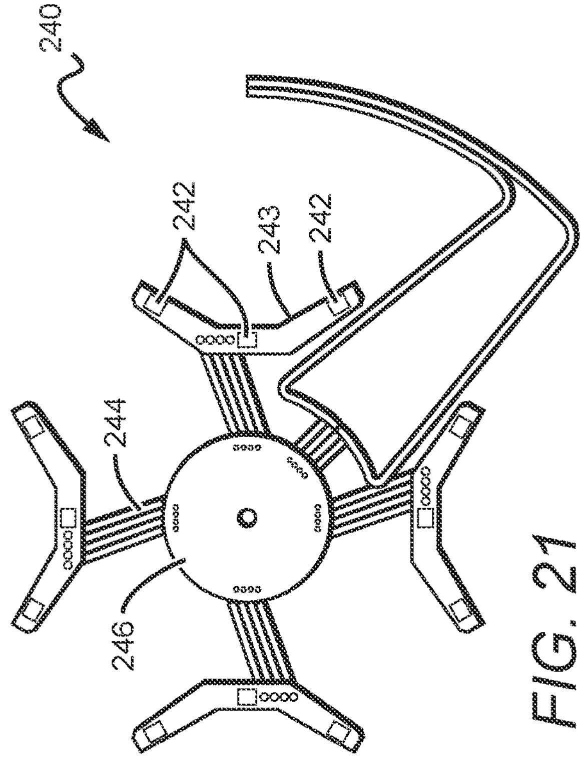
FIG. 21 is a front view of the light-emitting apparatus of the illuminated speaker cover according to the embodiment of the present disclosure shown in FIG. 16.
Figure 22:
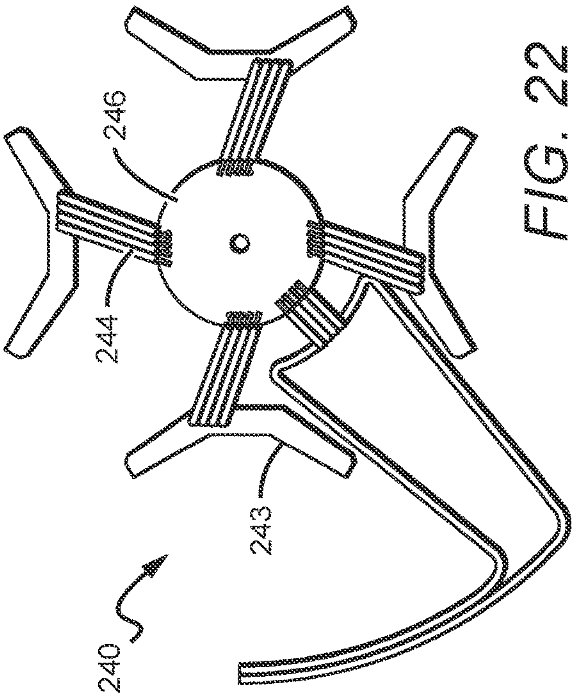
FIG. 22 is a back view of the light-emitting apparatus of the illuminated speaker cover according to the embodiment of the present disclosure shown in FIG. 16.
Figure 20:
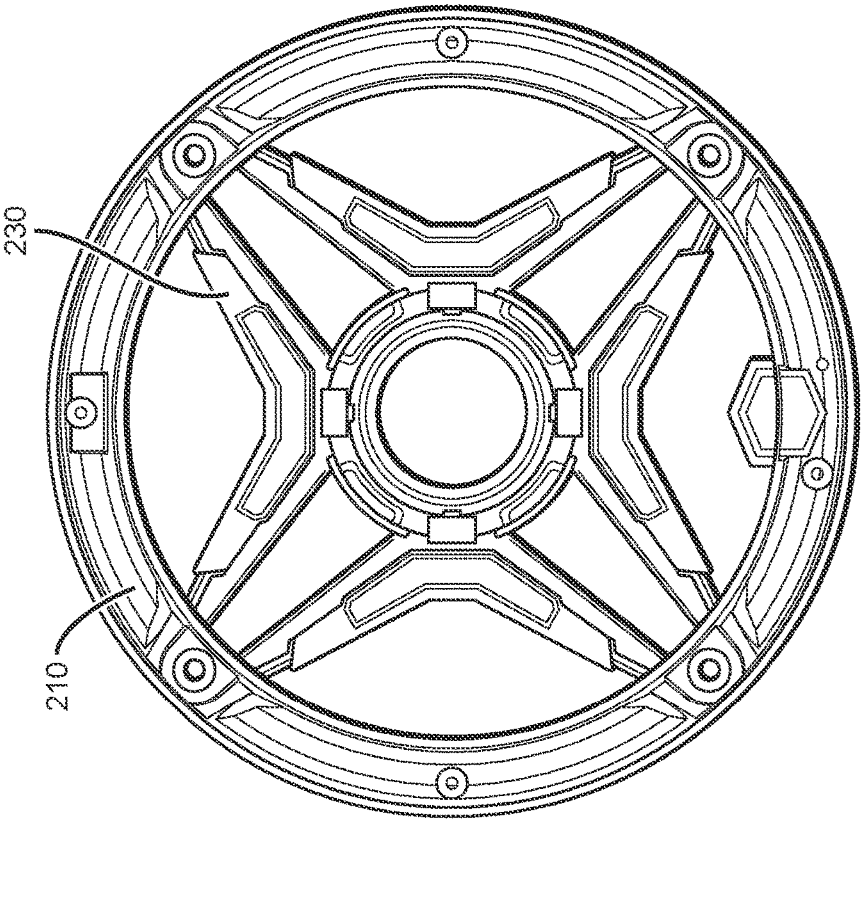
FIG. 20 is a back view of the grille, grille insert, and translucent components of the illuminated speaker cover according to the embodiment of the present disclosure shown in FIG. 16.

The light-emitting array 240 attaches to the back 202*b* of the grille 210. In the embodiment shown in FIGS. 21 and 22, the light-emitting array 240 comprises a plurality of illuminable components 243 with light emitting diodes 242, a circuit board 246, and a plurality of connectors 244 the illuminable components 243 to the circuit board 246. As shown in FIG. 18, the circuit board 246 of the light-emitting array 240 attaches to the back side 202*b* of the center frame of the grille 210. The light-emitting array 240, and more specifically, the illuminable components 243, are configured to attach to the back 202*b* of the grille 210 such that the illuminable components fit behind the translucent components 230 attached to the grille insert 220, both of which are attached to the front side 202*a* of the grille 210. This configuration allows for the illuminated speaker cover 200 to be illuminated through the translucent components 230. Simply put, this configuration allows for the illuminated speaker cover 200 to be illuminated from immediately behind the grille 210 and from within the illuminated speaker cover 200 rather than another source. FIG. 25 best shows the illumination of the speaker cover 200.

Although the present disclosure has been described in detail with reference to certain configurations thereof, other versions are possible. Embodiments of the present disclosure can comprise any combination of compatible features shown in the various figures, and these embodiments should not be limited to those expressly illustrated and discussed.

Therefore, the spirit and scope of the disclosure should not be limited to the versions described above.

The foregoing is intended to cover all modifications and alternative constructions falling within the spirit and scope of the disclosure as expressed in the claims, wherein no portion of the disclosure is intended, expressly or implicitly, to be dedicated to the public domain if not set forth in any claims.

We claim:

1. An illuminated speaker pod comprising:
- an outer shell with an open end, a closed end, and a body between said open end and closed end, wherein said body of said outer shell is shaped to define a plurality of openings;
- a translucent inner shell configured to be inserted into said outer shell, wherein said translucent inner shell comprises a plurality of raised portions configured to fill and seal said plurality of openings of said outer shell when said translucent inner shell is inserted into said outer shell;
- a light-emitting apparatus configured to be inserted into said translucent inner shell, wherein said light-emitting apparatus emits light through said plurality of translucent sections of said outer shell from within said translucent inner shell; and
- a pod cover configured to seal said translucent inner shell and said light-emitting apparatus within said outer shell.

2. The illuminated speaker pod of claim 1, wherein said pod cover is opaque.

3. The illuminated speaker pod of claim 1, wherein said pod cover is translucent.

4. The illuminated speaker pod of claim 1, said plurality of openings comprising four openings.

5. The illuminated speaker pod of claim 1, wherein said plurality of openings of said outer shell are rectangular slots.

6. The illuminated speaker pod of claim 1, wherein said light-emitting apparatus comprises an array of light emitting diodes.

7. The illuminated speaker pod of claim 1, wherein said outer shell and said inner shell are conical.

8. The illuminated speaker pod of claim 1, wherein at least a portion of said outer shell is translucent.

9. The illuminated speaker pod of claim 1, further comprising:
- a ring of light emitting diodes; and
- a translucent ring with a front side and a back side configured to enclose said ring of light emitting diodes, wherein said translucent ring is configured to seal against said pod cover on its front side and said outer shell on said back side.

10. An illuminated speaker cover comprising:
- a grille comprising:
  - a front side;
  - a back side;
  - an outer frame;
  - a center frame; and
  - at least one arm between said outer frame and said center frame;
- a grille insert attached to said front side of said grille;
- a plurality of translucent components configured to attach to said grille insert; and
- a light-emitting apparatus configured to connect to said back side of said grille and emit light towards said front end of said grille and through said plurality of translucent components;
- wherein said back side of said grille is configured to attach to a speaker such that said grille at least partially covers the face of the speaker.

11. The illuminated speaker cover of claim 10, wherein said grille insert is shaped like a star with a center and a plurality of arms that extend from said center.

12. The illuminated speaker cover of claim 11, wherein said translucent components attach to said grille insert in between two of said plurality of arms and at said center.

13. The illuminated speaker cover of claim 11, wherein said translucent components attach to said arms of said grille insert.

14. The illuminated speaker cover of claim 10, wherein said light-emitting apparatus comprises:
- a plurality of illuminable components with light emitting diodes wherein a plurality of translucent components are configured to cover said plurality of illuminable components;
- a circuit board; and
- a plurality of connectors connecting said plurality of illuminable components to said circuit board.

15. The illuminated speaker cover of claim 10, said plurality of translucent components comprising four translucent components.

16. The illuminated speaker cover of claim 14, wherein said circuit board attaches to an interior side of said center frame of said grille.

17. An illuminated speaker system comprising:
- a loudspeaker comprising a front end and a back end;
- an illuminated speaker pod comprising:
  - an outer shell with an open end, a closed end, and a body between said open end and closed end, wherein said body of said outer shell is shaped to define a plurality of openings;
  - a translucent inner shell configured to be inserted into said outer shell, wherein said translucent inner shell comprises a plurality of raised portions configured to fill and seal said plurality of openings of said outer shell when said translucent inner shell is inserted into said outer shell;
  - a light-emitting apparatus configured to integrate into said translucent inner shell, wherein said light-emitting apparatus emits light through said plurality of translucent sections of said outer shell from within said translucent inner shell; and
  - a pod cover configured to seal said translucent inner shell and said light-emitting apparatus within said outer shell; and
- an illuminated speaker cover comprising:
  - a grille comprising:
  - a front side;
  - a back side;
  - an outer frame;
  - a center frame; and
  - at least one arm between said outer frame and said center frame;
  - a grille insert attached to said front side of said grille;
  - a plurality of translucent components configured to attach to said grille insert; and
  - a light-emitting apparatus configured to connect to said back side of said grille and emit light towards said front end of said grille and through said plurality of translucent components;
  - wherein said back side of said grille is configured to attach to a speaker such that said grille at least partially covers the face of the speaker;

wherein said illuminated speaker pod is configured to house said speaker and seal against said illuminated speaker cover.

18. The illuminated speaker system of claim 17, wherein said illuminated speaker pod further comprises:

a ring of light emitting diodes; and a translucent ring with a front side and a back side configured to enclose said ring of light, wherein said translucent ring is configured to seal against a front side of said pod cover and a back side of said outer shell.

19. The illuminated speaker system of claim 17, wherein said illuminated speaker cover further comprises:

a plurality of illuminable components with light emitting diodes wherein said translucent components are configured to cover said plurality of illuminable components;

a circuit board; and a plurality of connectors connecting said plurality of illuminable components to said circuit board.

* * * * *